US011066721B2

(12) United States Patent
Koba et al.

(10) Patent No.: US 11,066,721 B2
(45) Date of Patent: Jul. 20, 2021

(54) HIGH-STRENGTH HOT-DIP COATED HOT-ROLLED STEEL SHEET AND METHOD FOR MANUFACTURING THE SAME

(71) Applicant: JFE STEEL CORPORATION, Tokyo (JP)

(72) Inventors: Masaki Koba, Tokyo (JP); Yoshitsugu Suzuki, Tokyo (JP); Hiroyuki Masuoka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 301 days.

(21) Appl. No.: 16/065,419

(22) PCT Filed: Nov. 8, 2016

(86) PCT No.: PCT/JP2016/004830
§ 371 (c)(1),
(2) Date: Jun. 22, 2018

(87) PCT Pub. No.: WO2017/110030
PCT Pub. Date: Jun. 29, 2017

(65) Prior Publication Data
US 2018/0305786 A1    Oct. 25, 2018

(30) Foreign Application Priority Data

Dec. 25, 2015    (JP) .............................. JP2015-252719

(51) Int. Cl.
| | |
|---|---|
| *C21D 6/00* | (2006.01) |
| *C21D 8/02* | (2006.01) |
| *C21D 9/46* | (2006.01) |
| *C22C 38/14* | (2006.01) |
| *C22C 38/12* | (2006.01) |
| *C22C 38/06* | (2006.01) |
| *C22C 38/04* | (2006.01) |
| *C22C 38/02* | (2006.01) |
| *C22C 38/00* | (2006.01) |
| *C23C 2/28* | (2006.01) |

(Continued)

(52) U.S. Cl.
CPC .................. *C21D 9/46* (2013.01); *B32B 7/02* (2013.01); *B32B 7/04* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C21D 6/00* (2013.01); *C21D 6/005* (2013.01); *C21D 6/008* (2013.01); *C21D 8/0205* (2013.01); *C21D 8/0221* (2013.01); *C21D 8/0226* (2013.01); *C21D 8/0263* (2013.01); *C21D 8/0278* (2013.01); *C21D 8/0405* (2013.01); *C21D 8/0426* (2013.01); *C21D 8/0478* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01);
(Continued)

(58) Field of Classification Search
CPC .. C21D 8/0205; C21D 8/0226; C21D 8/0263; C21D 8/0278; C21D 8/0478; C21D 8/0426; C21D 8/0221; C21D 8/0405; C21D 9/46; C21D 6/005; C21D 6/008; C21D 6/00; C23G 1/08; C23G 1/00; C23C 2/02; C23C 2/04; C23C 2/06; C23C 2/26; C23C 2/28; C23C 2/40; C23C 30/00; C23C 30/005; C23C 28/025; C23C 28/3225; C22C 38/00; C22C 38/002; C22C 38/02; C22C 38/04; C22C 38/12; C22C 38/06; C22C 38/14; B32B 15/013; B32B 15/012; B32B 15/01; B32B 15/04; B32B 15/043; B32B 15/18; B32B 7/04; B32B 7/02; Y10T 428/12451; Y10T 428/12472; Y10T 428/12757; Y10T 428/12799; Y10T 428/12958; Y10T 428/12972; Y10T 428/12993
See application file for complete search history.

(56) References Cited

U.S. PATENT DOCUMENTS

| | | |
|---|---|---|
| 2008/0193655 A1 | 8/2008 | Kloeckner et al. |
| 2012/0031528 A1 | 2/2012 | Hayashi et al. |

(Continued)

FOREIGN PATENT DOCUMENTS

| | | |
|---|---|---|
| CN | 102776436 A | 11/2012 |
| JP | H06-158254 A | 6/1994 |

(Continued)

OTHER PUBLICATIONS

P. Prevey, "X-Ray Diffraction Residual Stress Techniques," Lambda Technologies, 1986 (no month), pp. 380-392, downloaded from www.lambdatechs.com on Sep. 20, 2020. (Year: 1986).*

(Continued)

*Primary Examiner* — Michael E. La Villa
(74) *Attorney, Agent, or Firm* — Oliff PLC

(57) ABSTRACT

A high-strength hot-dip coated hot-rolled steel sheet excellent in terms of surface appearance quality and coating adhesiveness and a method for manufacturing. The method includes performing hot rolling followed by pickling on steel to form a pickled steel sheet, the steel having a chemical composition containing, by mass %, C: 0.02% or more and 0.30% or less, Si: 0.01% or more and 1.0% or less, Mn: 0.3% or more and 2.5% or less, P: 0.08% or less, S: 0.02% or less, Al: 0.001% or more and 0.20% or less, and Fe and inevitable impurities. The method further includes performing rolling with a rolling reduction ratio of 1% or more and 10% or less, and a hot-dip coating treatment. The obtained steel sheet has an arithmetic average roughness Ra of 2.0 μm or less on the surface of the steel sheet, and a tensile strength of 590 MPa or more.

10 Claims, No Drawings

(51) Int. Cl.

| | |
|---|---|
| C23C 2/40 | (2006.01) |
| B32B 15/01 | (2006.01) |
| C23C 2/02 | (2006.01) |
| C23C 2/06 | (2006.01) |
| C23C 2/26 | (2006.01) |
| C23G 1/08 | (2006.01) |
| C23C 28/00 | (2006.01) |
| C23C 2/04 | (2006.01) |
| C23C 28/02 | (2006.01) |
| B32B 15/18 | (2006.01) |
| C23C 30/00 | (2006.01) |
| B32B 7/04 | (2019.01) |
| C21D 8/04 | (2006.01) |
| B32B 15/04 | (2006.01) |
| B32B 7/02 | (2019.01) |
| C23G 1/00 | (2006.01) |

(52) U.S. Cl.
CPC .......... *C23C 2/04* (2013.01); *C23C 2/06* (2013.01); *C23C 2/26* (2013.01); *C23C 2/28* (2013.01); *C23C 2/40* (2013.01); *C23C 28/025* (2013.01); *C23C 28/3225* (2013.01); *C23C 30/00* (2013.01); *C23C 30/005* (2013.01); *C23G 1/00* (2013.01); *C23G 1/08* (2013.01); *Y10T 428/12451* (2015.01); *Y10T 428/12472* (2015.01); *Y10T 428/12757* (2015.01); *Y10T 428/12799* (2015.01); *Y10T 428/12958* (2015.01); *Y10T 428/12972* (2015.01); *Y10T 428/12993* (2015.01)

(56) References Cited

U.S. PATENT DOCUMENTS

| | | | |
|---|---|---|---|
| 2014/0349134 A1 | 11/2014 | Nagano et al. | |
| 2015/0140358 A1 | 5/2015 | Yokoyama et al. | |
| 2015/0184273 A1* | 7/2015 | Makimizu ............... | C22C 18/00 428/659 |

FOREIGN PATENT DOCUMENTS

| | | |
|---|---|---|
| JP | H09-279302 A | 10/1997 |
| JP | H10-081948 A | 3/1998 |
| JP | 2002-317257 A | 10/2002 |
| JP | 2006-161139 A | 6/2006 |
| JP | 2012-097326 A | 5/2012 |
| WO | 2006097237 A1 | 9/2006 |
| WO | 2010/131303 A1 | 11/2010 |
| WO | 2010/137317 A1 | 12/2010 |
| WO | 2013/103117 A1 | 7/2013 |
| WO | 2013/150669 A1 | 10/2013 |

OTHER PUBLICATIONS

Jul. 25, 2018 Extended Search Report issued in European Patent Application No. 16877935.3.

Jun. 15, 2020 Office Action issued in Chinese Patent Application No. 201680076114.1.

Feb. 14, 2017 International Search Report issued in Patent Application No. PCT/JP2016/004830.

Dec. 6, 2019 Office Action issued in Korean Patent Application No. 10-2018-7017816.

Jun. 12, 2018 Office Action issued in Japanese Patent Application No. 2015-252719.

Sep. 24, 2019 Office Action issued in Chinese Patent Application No. 201680076114.1.

Oct. 21, 2020 Office Action issued in Chinese Patent Application No. 201680076114.1.

Prevey, P., "Metals Handbook: X-Ray Diffraction Residual Stress Techniques", American Society for Metals, pp. 380-392, (1986).

* cited by examiner

HIGH-STRENGTH HOT-DIP COATED HOT-ROLLED STEEL SHEET AND METHOD FOR MANUFACTURING THE SAME

TECHNICAL FIELD

The present disclosure relates to a high-strength hot-dip coated hot-rolled steel sheet excellent in terms of surface appearance quality and coating adhesiveness whose base material is a high-strength hot-rolled steel sheet containing Si and Mn and a method for manufacturing the coated steel sheet

BACKGROUND ART

Nowadays, there is a growing trend toward using high-strength steel sheets having a tensile strength of 590 MPa or more in order to improve fuel efficiency and collision resistance in the field of automotive steel sheets. There is a case where hot-rolled steel sheets, which are manufactured at low cost, are used as such high-strength steel sheets, and there is a case where such high-strength steel sheets are subjected to hot-dip coating treatment in order to, for example, improve corrosion resistance.

Generally, a hot-dip coated hot-rolled steel sheet is manufactured by using, as a base material, a steel sheet which is manufactured by performing hot rolling on a slab, by performing recrystallization annealing on the base steel sheet as the base material in an annealing furnace in a CGL, and by performing hot-dip coating treatment on the annealed steel sheet. In addition, an alloyed hot-dip coated steel sheet is manufactured by further performing an alloying treatment on the hot-dip coated steel sheet.

It is important that a hot-dip coated steel sheet which is used in the application described above have good surface appearance quality and good coating adhesiveness. However, in the case of a hot-dip coated hot-rolled steel sheet containing Si after pickling has been performed thereon, since local residual scale and the formation of local smut due to over-pickling often occur on the surface of the steel sheet, and, since the degree of surface asperity is high, defects such as bare spots and insufficient alloying treatment tend to occur. The term "bare spots" denotes a phenomenon in which some portions of the surface of a steel sheet are left uncoated in a hot-dip coating treatment and the surface of the steel sheet are exposed. Since such portions each usually occupy regions of a millimeter-order size, it is possible to recognize the existence of the bare spots by a visual observation.

Some approaches have been proposed in order to solve the problems described above. For example, Patent Literature 1 proposes a method in which a hot-rolled steel sheet as a base material is subjected to shot blasting or brush polishing when pickling for descaling is performed in order to prevent coating defects such as alloying defects from occurring in the case when a galvannealed steel sheet whose base material contains Si, Mn, P, and so forth is manufactured.

Patent Literature 2 proposes a method for improving the adhesiveness of a coating film in which the surface of a base material is polished, and then subjected to heating to a temperature of 600° C. or higher in a reducing atmosphere, cooling, a hot-dip coating treatment, and an alloying treatment.

Patent Literature 3 proposes a manufacturing method in which a steel sheet is subjected to rolling with a rolling reduction ratio of 0.1% to 1.0% after annealing has been performed in a non-oxidizing atmosphere and immediately before the steel sheet is dipped in a galvanizing bath.

Patent Literature 4 proposes a method for manufacturing a galvannealed steel sheet in which a hot-rolled steel sheet or an annealed cold-rolled steel sheet is subjected to soft reduction with a rolling reduction ratio of 1.0% to 20% followed by a low-temperature heat treatment being held at a temperature of 520° C. to 650° C. for 5 seconds or more, dipped in a galvanizing bath containing, by mass %, Al: 0.01% to 0.18%, and subjected to an alloying treatment.

However, in the case of the method according to Patent Literature 1, it is necessary to perform shot blasting or brush polishing on a base material before a coating treatment is performed. In the case of the method according to Patent Literature 2, a polishing treatment is necessary. As described above, in the case of any one of the methods according to Patent Literature 1 and Patent Literature 2, since treatments which require time and money are necessary, there is a problem of a deterioration in productivity.

Since the method according to Patent Literature 3 is intended for preventing a delay in alloying, it is not necessarily possible to achieve a sufficient effect for improving powdering resistance.

In addition, in the case of the method according to Patent Literature 4, it is not possible to achieve a sufficiently high level of powdering resistance corresponding to a higher level of strength and workability which a current high-strength steel sheets are required to have.

When a hot-dip coating film is subjected to an alloying treatment, since there is an increase in the hardness of the coating film, defects (such as powdering) tend to occur in the coating film when forming is performed. The term "powdering" denotes a phenomenon in which an alloy layer in a coating film which is subjected to compressive deformation is disintegrated into powder and separated from a base material. Since the separated pieces of the coating film are stacked in a mold, there is a deterioration in the slide capability of a coated steel sheet, which results in forming defects occurring in the coated steel sheet. Also, the stacked separated pieces cause pressing flaws.

CITATION LIST

Patent Literature

PTL 1: Japanese Unexamined Patent Application Publication No. 6-158254
PTL 2: Japanese Unexamined Patent Application Publication No. 10-81948
PTL 3: Japanese Unexamined Patent Application Publication No. 2012-97326
PTL 4: Japanese Unexamined Patent Application Publication No. 2002-317257

SUMMARY

Technical Problem

The present disclosure has been completed in view of the situation described above, and an object of the present disclosure is to provide a high-strength hot-dip coated hot-rolled steel sheet excellent in terms of surface appearance quality and coating adhesiveness and a method for manufacturing the coated steel sheet.

Solution to Problem

The present inventors diligently conducted investigations in order to solve the problems described above and, as a result, found that it is possible to obtain a high-strength hot-dip coated hot-rolled steel sheet excellent in terms of surface appearance quality and coating adhesiveness by controlling the surface roughness and residual stress of a steel sheet.

The present disclosure has been completed on the basis of the knowledge described above and the exemplary disclosed embodiments of the present disclosure are as follows.

[1] A method for manufacturing a high-strength hot-dip coated hot-rolled steel sheet, the method including performing hot rolling followed by pickling on steel having a chemical composition containing, by mass %, C: 0.02% or more and 0.30% or less, Si: 0.01% or more and 1.0% or less, Mn: 0.3% or more and 2.5% or less, P: 0.08% or less, S: 0.02% or less, Al: 0.001% or more and 0.20% or less, and the balance being Fe and inevitable impurities, performing rolling on the pickled steel sheet with a rolling reduction ratio of 1% or more and 10% or less, and performing a hot-dip coating treatment thereafter.

[2] The method for manufacturing a high-strength hot-dip coated hot-rolled steel sheet according to item [1] above, in which the chemical composition further contains, by mass %, one, two, or more of Ti: 0.01% or more and 0.40% or less, Nb: 0.001% or more and 0.200% or less, V: 0.001% or more and 0.500% or less, Mo: 0.01% or more and 0.50% or less, and W: 0.001% or more and 0.200% or less.

[3] The method for manufacturing a high-strength hot-dip coated hot-rolled steel sheet according to item [1] or [2] above, the method further including performing annealing, after the rolling is performed and before the hot-dip coating treatment is performed, in a furnace atmosphere having a hydrogen concentration of 2 vol % or more and 20 vol % or less and a dewpoint of −60° C. or higher and −10° C. or lower with a maximum endpoint temperature (T) of the steel sheet of 650° C. or higher and 750° C. or lower in a temperature range of (T−50)° C. or higher and T° C. or lower for a holding time of 10 seconds or more and 500 seconds or less.

[4] The method for manufacturing a high-strength hot-dip coated hot-rolled steel sheet according to any one of items [1] to [3] above, the method further including performing an alloying treatment after the hot-dip coating treatment is performed.

[5] A high-strength hot-dip coated hot-rolled steel sheet having a chemical composition containing, by mass %, C: 0.02% or more and 0.30% or less, Si: 0.01% or more and 1.0% or less, Mn: 0.3% or more and 2.5% or less, P: 0.08% or less, S: 0.02% or less, Al: 0.001% or more and 0.20% or less, and the balance being Fe and inevitable impurities, an arithmetic average roughness Ra of 2.0 μm or less on the surface of the steel sheet, and a tensile strength of 590 MPa or more, in which an average residual stress σ in the α-Fe (211)-plane on the surface of the steel sheet satisfies the relationship −250 MPa≤σ≤−30 MPa.

[6] The high-strength hot-dip coated hot-rolled steel sheet according to item [5] above, in which the chemical composition further contains, by mass %, one, two, or more of Ti: 0.01% or more and 0.40% or less, Nb: 0.001% or more and 0.200% or less, V: 0.001% or more and 0.500% or less, Mo: 0.01% or more and 0.50% or less, and W: 0.001% or more and 0.200% or less.

Here, the high-strength hot-dip coated hot-rolled steel sheet according to the present disclosure has a tensile strength (TS) of 590 MPa or more and a base material thereof is a hot-rolled steel sheet. The high-strength hot-dip coated hot-rolled steel sheet according to the present disclosure includes one which is subjected to a hot-dip coating treatment and one which is further subjected to an alloying treatment after the hot-dip coating treatment has been performed. In addition, the coating treatment in the present disclosure includes a Zn coating treatment, Zn—Al coating treatment, and Al coating treatment.

In addition, the term "excellent in terms of surface appearance quality" denotes a case where a steel sheet has a surface appearance without bare spots or a variation in the degree of alloying.

Advantageous Effects

According to the present disclosure, it is possible to obtain a high-strength hot-dip coated hot-rolled steel sheet excellent in terms of surface appearance quality and coating adhesiveness. Since the steel sheet is very useful from the viewpoint of formability because of sufficient formability to withstand intense work, the present disclosure has a very large effect on the industry.

It is possible to stably manufacture a hot-dip coated hot-rolled steel sheet containing Si and Mn. In addition, since it is possible to relax the limitation on the contents of Si and Mn, it is possible to use a base material containing large amounts of Si and Mn, which has a large effect on the industry, for example, in such a manner that the chemical composition of steel is easily designed.

DESCRIPTION OF EMBODIMENTS

Hereafter, the exemplary embodiments of the present disclosure will be specifically described.

In the description below, the contents of the constituent chemical elements of the chemical composition of steel and the contents of the constituent chemical elements of the chemical composition of a coating layer are expressed in units of "mass %", and "mass %" is referred to as "%", unless otherwise noted. In addition, hydrogen concentration is expressed in units of "vol %", and "volt" is referred to as "%", unless otherwise noted.

The high-strength hot-dip coated hot-rolled steel sheet excellent in terms of surface appearance quality and coating adhesiveness according to the present disclosure has a chemical composition containing, by mass %, C: 0.02% or more and 0.30% or less, Si: 0.01% or more and 1.0% or less, Mn: 0.3% or more and 2.5% or less, P: 0.08% or less, S: 0.02% or less, Al: 0.001% or more and 0.20% or less, and the balance being Fe and inevitable impurities, an arithmetic average roughness Ra of 2.0 μm or less on the surface of the steel sheet, and a tensile strength of 590 MPa or more, in which an average residual stress σ in the α-Fe (211)-plane on the surface of the steel sheet satisfies the relationship −250 MPa≤σ≤−30 MPa. That is, the present disclosure decreases variation in the coating weight and degree of reaction of a coating layer as a result of applying rolling reduction to a steel sheet after hot rolling and pickling have been performed so as to decrease the surface roughness of the surface of the steel sheet. Moreover, the present disclosure is featured by improving coating adhesiveness as a result of applying residual stress to the surface of a steel sheet when reduction (rolling) is performed so as to promote an Fe—Al reaction and an Fe—Zn reaction. As a result, it is possible to obtain a high-strength hot-dip coated hot-rolled steel sheet excellent in terms of surface appearance quality and coating adhesiveness.

The reasons for the limitations on the steel chemical composition of the high-strength hot-dip coated hot-rolled steel sheet excellent in terms of surface appearance quality and coating adhesiveness according to the present disclosure will be first described.

C: 0.02% or More and 0.30% or Less

It is possible to improve the strength of a steel sheet at low cost by adding C, although the formability of a base material improves with a decrease in the C content. Therefore, the C content is set to be 0.02% or more, or preferably 0.04% or more. On the other hand, in the case where the C content is excessively large, there is a deterioration in the toughness and weldability of a steel sheet. Therefore, the C content is set to be 0.30% or less, or preferably 0.20% or less.

Si: 0.01% or More and 1.0% or Less

Si is effective as a solute-strengthening chemical element, and it is necessary that the Si content be 0.01% or more in order to improve the strength of a steel sheet. However, in the case where the Si content is excessively large, since there is a deterioration in alloying reactivity due to a deterioration in wettability when a hot-dip coating treatment is performed, it is difficult to control an alloying treatment, which results in a deterioration in coating-surface appearance quality, coating adhesiveness, and powdering resistance. Therefore, the Si content is set to be 0.01% or more and 1.0% or less.

Mn: 0.3% or More and 2.5% or Less

Mn is a chemical element which is effective for improving the strength of steel. It is necessary that the Mn content be 0.3% or more in order to produce such an effect. However, in the case where the Mn content is excessively large, since there is a deterioration in alloying reactivity due to a deterioration in wettability when a hot-dip coating treatment is performed, it is difficult to control an alloying treatment, which results in a deterioration in coating-surface appearance quality, coating adhesiveness, and powdering resistance. Therefore, the Mn content is set to be 0.3% or more and 2.5% or less. It is preferable that the Mn content be 0.3% or more. It is preferable that the Mn content be 2.0% or less.

P: 0.08% or Less

In the case where the P content is more than 0.08%, there is a deterioration in weldability and surface quality. In addition, in that case, there is a deterioration in the ductility of a base steel sheet and the adhesiveness of an alloyed hot-dip coating layer in the case where the alloying treatment temperature is increased, although it is not possible to achieve a desired degree of alloying unless an alloying treatment temperature is increased for an alloying treatment. Therefore, the P content is set to be 0.08% or less.

S: 0.02% or Less

In the case where S is segregated at grain boundaries or a large amount of MnS is formed, there is a deterioration in toughness. Therefore, it is necessary that the S content be 0.02% or less. It is not necessary to put a particular limitation on the lower limit of the S content, and S may be contained in such a small amount that S is regarded as an impurity.

Al: 0.001% or More and 0.20% or Less

Although Al is added for the purpose of deoxidation of molten steel, it is not possible to achieve this purpose in the case where the Al content is less than 0.001%. On the other hand, in the case where the Al content is more than 0.20%, large amounts of inclusions are formed, which results in flaws occurring in a steel sheet. Therefore, the Al content is set to be 0.001% or more and 0.20% or less.

The balance is Fe and inevitable impurities.

In the present disclosure, the chemical composition may further contain, by mass %, one, two, or more of Ti: 0.01% or more and 0.40% or less, Nb: 0.001% or more and 0.200% or less, V: 0.001% or more and 0.500% or less, Mo: 0.01% or more and 0.50% or less, and W: 0.001% or more and 0.200% or less for the purposes described below.

Ti, Nb, V, Mo, and W are chemical elements which are necessary for forming precipitates (in particular, carbides) in a base steel sheet, and it is preferable that one, two, or more selected from the group consisting of these chemical elements be added. Usually, these chemical elements are contained in a base steel sheet in the form of precipitates containing these chemical elements. Among these chemical elements, Ti has particularly high precipitation strengthening capability, and Ti is also an effective chemical element from the viewpoint of cost. However, in the case where the Ti content is less than 0.01%, there may be a case where a sufficient amount of precipitates, which are necessary to cause precipitates (in particular, carbides) to be contained in an alloyed hot-dip coating layer, is not contained in a base steel sheet. In the case where the Ti content is more than 0.40%, such an effect becomes saturated, and there is an increase in cost. Therefore, in the case where Ti is added, the Ti content is set to be 0.01% or more and 0.40% or less.

Here, in the case where Nb, V, Mo, and W each are added, for similar reasons to those for the upper and lower limits of the Ti content described above, the Nb content is set to be 0.001% or more and 0.200% or less, the V content is set to be 0.001% or more and 0.500% or less, the Mo content is set to be 0.01% or more and 0.50% or less, and the W content is set to be 0.001% or more and 0.200% or less.

Arithmetic Average Roughness Ra on Surface of Steel Sheet: 2.0 μm or Less

In the present disclosure, by controlling the surface roughness of a steel sheet, the Fe—Al reaction and the Fe—Zn reaction homogeneously occur on the surface of a steel sheet, which causes a decreased variation in coating weight. The arithmetic average roughness (Ra) is used in order to indicate the surface roughness of a steel sheet, and Ra is set to be 2.0 μm or less in order to produce the effect of improving coating properties. In particular, in the case where a base material containing large amounts of Si and Mn is used, since there is an increase in surface roughness due to scale flaws typified by red scale, and since there is a decrease in alloying rate due to Si oxides and Mn oxides which are formed when annealing is performed, a variation in the degree of alloying tends to become marked. In contrast, in the case where Ra is 2.0 μm or less, since the Fe—Al reaction and the Fe—Zn reaction on the surface of a steel sheet are homogenized, stress concentration when bending work is performed is prevented, and there is no deterioration in surface appearance quality, coating adhesiveness, or powdering resistance. Here, it is possible to determine the arithmetic average roughness Ra by using the method described in EXAMPLE below. In addition, by performing rolling with a rolling reduction ratio of 1% or more and 10% or less after pickling has been performed, it is possible to control the arithmetic average roughness Ra on the surface of a steel sheet to be 2.0 μm or less even in the case where a base material containing large amounts of Si and Mn is used.

Average Residual Stress σ in α-Fe (211)-Plane on Surface of Steel Sheet: Satisfying the Relationship −250 MPa≤σ≤−30 MPa In the present disclosure, by applying compressive residual stress to the surface of a base material, there is an improvement in Fe—Al reactivity and Fe—Zn alloying reactivity. In addition, the reduction of an oxide film, which is formed after pickling has been performed, is promoted. The residual stress described above should satisfy the relationship −250 MPa≤σ≤−30 MPa in order to realize such an effect of improving coating properties. In the case where the residual stress is more than −30 MPa, since sufficient compressive residual stress is not applied, the effect of improving coating properties is less likely to be realized. In the case where the residual stress is less than −250 MPa, the effect of improving coating properties becomes saturated. In addition, since a large number of dislocations are formed in the surface layer of a steel sheet, there is an increase in the grain diameter of the microstructure in the surface layer during annealing before a coating treatment is performed, which induces a deterioration in strength. Therefore, the average residual stress σ in the α-Fe (211)-plane on the surface of the steel sheet should satisfy the relationship −250 MPa≤σ≤−30 MPa. Here, it is possible to control the average residual stress σ so as to satisfy the relationship −250 MPa≤σ≤−30 MPa by controlling the rolling reduction ratio of rolling, which is performed after pickling has been performed, to be 1% or more and 10% or less.

In addition, the average residual stress σ was determined by using an ISO-inclination method, and the residual stress (σ) of a steel sheet was determined by performing observation which utilized an X-ray diffractometer 5 times at arbitrary positions and from arbitrary directions and by calculating the average value of the 5 observation results. By calculating a gradient (R) through the use of equation (1) on the basis of the relationship between the displacement value (ΔS) of the peak intensity (S) of the α-Fe (211)-plane and inclination angle Ψ, it is possible to calculate the residual stress (σ) by using equation (2) below from R and the Young's modulus (E) of a steel material.

$$R = \Delta S / (\sin^2 \psi) \quad (1)$$

$$\sigma = R \times E \quad (2)$$

Hereafter, the method for manufacturing the high-strength hot-dip coated hot-rolled steel sheet excellent in terms of surface appearance quality and coating adhesiveness will be described.

The high-strength hot-dip coated hot-rolled steel sheet according to the present disclosure is manufactured by performing hot rolling followed by pickling on steel having the chemical composition described above, by performing rolling on the pickled steel sheet with a rolling reduction ratio of 1% or more and 10% or less, and by performing a hot-dip coating treatment thereafter. Moreover, it is preferable to perform annealing, after the rolling has been performed, in a furnace atmosphere having a hydrogen concentration of 2 vol % or more and 20 vol % or less and a dewpoint of −60° C. or higher and −10° C. or lower with a maximum endpoint temperature (T) of the steel sheet of 650° C. or higher and 750° C. or lower in a temperature range of (T−50)° C. or higher and T° C. or lower for a holding time of 10 seconds or more and 500 seconds or less. In addition, an alloying treatment may further be performed after the hot-dip coating treatment has been performed.

Hot Rolling

Hot Rolling Start Temperature (Slab Heating Temperature)

It is necessary to first dissolve Ti, Nb, and so forth in a steel sheet before hot rolling is performed in order to disperse the fine precipitates of Ti, Nb, and so forth. Therefore, it is preferable that the heating temperature (slab heating temperature) before hot rolling is performed be 1100° C. or higher. On the other hand, in the case where the heating temperature is higher than 1300° C., since internal oxidation in the surface layer of steel is promoted, there is a risk of a deterioration in surface quality. Therefore, it is preferable that the slab heating temperature before hot rolling is performed be 1100° C. or higher and 1300° C. or lower.

Finishing Delivery Temperature

It is preferable that the finishing delivery temperature be 800° C. or higher in order to easily perform operation by decreasing resistance to deformation when hot rolling is performed. On the other hand, in the case where the finishing delivery temperature is higher than 1000° C., since scale flaws tend to occur, there may be a deterioration in surface quality. Therefore, it is preferable that the finishing delivery temperature be 800° C. or higher and 1000° C. or lower.

Hot Rolling Coiling Temperature

The steel sheet according to the present disclosure contains easily oxidizable chemical elements such as Si, Mn, and Ti. Therefore, it is preferable that the hot rolling coiling temperature be 600° C. or lower in order to achieve satisfactory good surface quality by inhibiting excessive oxidation of a steel sheet. On the other hand, in the case where the hot rolling coiling temperature is 400° C. or lower, since coil quality defects tend to occur due to a variation in the degree of cooling, there is a risk of a deterioration in productivity. Therefore, it is preferable that the hot rolling coiling temperature be 400° C. or higher and 600° C. or lower.

Pickling

The hot-rolled steel sheet obtained through the hot rolling process is subjected to pickling for descaling followed by rolling. It is not necessary to put a particular limitation on the method used for pickling, and a commonly used method may be used. Here, rolling with a rolling reduction ratio of 5% or less may be performed before the pickling process. By performing rolling with a rolling reduction ratio of 5% or less, there is an improvement in descaling capability, which results in an improvement in surface quality.

Rolling with a Rolling Reduction Ratio of 1% or More and 10% or Less

Rolling is performed after pickling following hot rolling has been performed in order to improve the coatability of the surface of a steel sheet. The rolling reduction ratio when rolling is performed is set to be 1% or more and 10% or less. Rolling reduction is applied to a steel sheet in order to control the surface roughness and to apply residual stress to the surface of a base material. In the case where the rolling reduction ratio is 1% or more, since sufficient residual stress is applied to a steel sheet, there is an improvement in the coatability of the surface of a steel sheet. In the case where the rolling reduction ratio is more than 10%, the effect of improving coating properties becomes saturated, and in addition, there is coarsening of a microstructure in the surface layer when annealing is performed before a coating treatment is performed due to a large number of dislocations being formed in the surface layer of a steel sheet, which results in a deterioration in strength.

Annealing

Annealing may be performed before a hot-dip coating treatment is performed. Although it is not necessary to put a particular limitation on the condition used for annealing, it is preferable that annealing be performed with a maximum endpoint temperature (T) of a steel sheet of 650° C. or higher and 750° C. or lower in a temperature range of (T−50)° C. or higher and T° C. or lower for a holding time of 10 seconds or more and 500 seconds or less. In the case where the maximum endpoint temperature of a steel sheet is lower than 650° C., since an oxide film, which is formed after pickling has been performed, is not completely reduced, there may be a case where it is not possible to achieve the desired coating properties. In addition, in the case where the maximum endpoint temperature of a steel sheet is higher than 750° C., since the surface segregation of Si, Mn, and so forth occurs, there may be a deterioration in coatability. In addition, in the case where the holding time in a temperature range of (T-50)° C. or higher and T° C. or lower is less than 10 seconds, since an oxide film, which is formed after pickling has been performed, is not completely reduced, there may be a deterioration in hot-dip coating-surface appearance quality and coating properties. On the other hand, in the case where the holding time in a temperature range of (T-50)° C. or higher and T° C. or lower is more than 500 seconds, there may be a deterioration in the productivity of a hot-dip coated steel sheet.

In addition, it is preferable that a furnace atmosphere have a hydrogen concentration of 2% or more and 20% or less and a dewpoint of −60° C. or higher and −10° C. or lower. The furnace atmosphere should be a reducing atmosphere, and it is preferable that the dewpoint be −60° C. or higher and −10° C. or lower and that the atmosphere contain 2% or more and 20% or less of hydrogen and the balance being an inert gas. In the case where the dewpoint is higher than −10° C., Si oxides, which are formed on the surface of a steel sheet, tend to take on a film-like shape. On the other hand, it is difficult to industrially realize a dewpoint of lower than −60° C. In the case where the hydrogen concentration is less than 2%, reducing capability is poor. In the case where the hydrogen concentration is more than 20%, since there is a risk in that combustion occurs at the entrance of an annealing furnace where the furnace atmosphere comes into contact with the atmospheric air, it is difficult to perform stable operation. It is possible to achieve sufficient reducing capability in the case where the hydrogen concentration is 20% or lower.

Hot-Dip Coating Treatment

A hot-dip coating treatment is performed by using a hot-dip coating bath after reduction annealing has been performed on the steel sheet described above in a continuous hot-dip coating line.

The chemical composition of the hot-dip coating bath has, for example, an Al concentration of 0.01% or more and 1.0% or less with the balance being Zn and inevitable impurities in the case of a galvanizing treatment. In the case where the Al concentration is less than 0.01%, since Zn—Fe alloying occurs when a coating treatment is performed, a brittle alloy layer grows at the interface between a coating film and a steel sheet (base material), which results in a deterioration in coating adhesiveness. In the case where the Al concentration is more than 1.0%, since the growth of an Fe—Al alloy layer becomes marked, there is a deterioration in coating adhesiveness. It is not necessary to put a particular limitation on the temperature of the coating bath, and the temperature may be within a commonly used operation temperature range of 440° C. or higher and 480° C. or lower. In addition, it is not necessary to put a particular limitation on coating weight, it is preferable that the coating weight be 30 g/m² or more from the viewpoint of corrosion resistance, and it is preferable that the coating weight be 150 g/m² or less from the viewpoint of workability.

Alloying Treatment

In the case where the alloying treatment temperature is higher than 550° C., since the formation of a hard and brittle Γ phase at the interface between a steel sheet (base material) and a coating film becomes marked when an alloying treatment is performed, there is an increase in surface roughness, and there is a deterioration in powdering resistance. Therefore, it is preferable that the alloying treatment temperature be 550° C. or lower, or more preferably 530° C. or lower.

It is preferable that the alloying treatment time be 10 seconds or more and 60 seconds or less from the viewpoint of cost and controlling conditions. It is more preferable that the alloying treatment time be 40 seconds or less.

It is not necessary to put a particular limitation on the heating method for an alloying treatment, and any one of known methods such as a radiation heating method, an energization heating method, and a high-frequency induction heating method may be used. Cooling is performed to room temperature after an alloying treatment has been performed. It is not necessary to put a particular limitation on a treatment performed after a coating treatment has been performed, and commonly used posttreatments such as skin pass rolling for controlling material properties, leveling or the like for correcting shape flatness, and, as needed, a chromate treatment may be performed.

Example 1

Hereafter, the exemplary embodiments of the present disclosure will be specifically described on the basis of examples. However, the present disclosure is not limited to the examples described here.

Slabs having the chemical compositions given in Table 1 were cast, hot rolled, and pickled by using commonly used methods, followed by rolling, annealing, and a galvanizing treatment, which were performed under the conditions given in Table 2. In some of the run numbers in EXAMPLE 1, an alloying treatment was further performed.

The residual stress (σ) of the surface of the steel sheet which had been subjected to hot rolling and pickling was determined by performing observation which utilized an X-ray diffractometer 10 times at arbitrary positions and from arbitrary directions and by calculating the average value of the 10 observation results.

The arithmetic average roughness Ra on the surface of the steel sheet was determined by measuring arithmetic average roughness 3 times each in the rolling direction and a direction perpendicular to the rolling direction and by calculating the average value of the measurement results.

When the galvanizing treatment was performed, the temperature of the galvanizing bath was 460° C., and the coating weight was controlled to be 50 g/m² per side by using a wiping method. The alloying treatment was performed at an alloying treatment temperature of 530° C.

By performing the tests described below on the galvanized hot-rolled steel sheets obtained as described above in order to evaluate tensile properties, coating-surface appearance quality, and coating adhesiveness (powdering resistance). The determination methods and the evaluation standards will be described below.

Tensile Properties

By performing a tensile test on a JIS No. 5 tensile test piece which was taken so that the tensile direction was perpendicular to the rolling direction of the steel sheet and a JIS No. 5 tensile test piece which was taken so that the tensile direction was parallel to the rolling direction of the steel sheet in accordance with JIS Z 2241 (2011), TS (tensile strength) was determined. By performing a tensile test on 5 samples which were taken so that the tensile direction was perpendicular to the rolling direction of the steel sheet and 5 samples which were taken so that the tensile direction was parallel to the rolling direction of the steel sheet, and by defining the average value of the results as the tensile strength (TS), a case where the tensile strength (TS) was 590 MPa or more was judged as good.

Coating-Surface Appearance Quality

By performing a visual observation on the surface appearance of the steel sheet after a hot-dip coating treatment had been performed and the steel sheet after an alloying treatment had been performed, a case where neither bare spots nor a variation in the degree of alloying was observed was judged as ◯, and a case where bare spots or a variation in the degree of alloying was observed was judged as x.

Coating Adhesiveness

The coating adhesiveness of the galvanized hot-rolled steel sheet was evaluated by performing a ball impact test. By performing a ball impact test with a ball weight of 2.8 kg and a falling height of 1 m, and by performing a tape-peeling test on the worked portion, the presence or absence of the separation of a coating layer was judged by performing a visual observation.

◯: without coating-layer separation
x: with coating-layer separation

Powdering Resistance

The coating adhesiveness of the galvanized hot-rolled steel sheet (after an alloying treatment had been performed) was evaluated by performing a test for evaluating powdering resistance. After having performed a 90-degree bending-unbending test on the surface of the galvannealed steel sheet to which a cellophane tape was stuck, the tape was peeled. The amount of coating layer which was separated from a portion of 10 mm×40 mm at a position in the steel sheet on which bending and unbending had been performed was determined from the material stuck to the peeled tape by using a Zn count number obtained by performing X-ray fluorescence spectrometry, and the evaluation was performed on the basis of the following standard.

Fluorescent X-ray count number and corresponding rank
  less than 1500: ⊙ (good)
  1500 or more and less than 3000: ◯
  3000 or more and less than 5000: Δ
  5000 or more: x (poor)

The results obtained as described above are given in Table 2 along with the manufacturing conditions.

TABLE 1

| | | | | | | mass % | | | | | | |
|---|---|---|---|---|---|---|---|---|---|---|---|---|
| Steel Grade | C | Si | Mn | P | S | Al | Ti | Nb | V | Mo | W | Note |
| A | 0.065 | 0.15 | 2.28 | 0.008 | 0.0008 | 0.043 | 0.013 | 0.023 | 0.048 | 0 | 0 | Example |
| B | 0.070 | 0.40 | 0.70 | 0.005 | 0.0010 | 0.005 | 0.150 | 0 | 0 | 0 | 0.02 | Example |
| C | 0.100 | 0.45 | 2.36 | 0.010 | 0.0008 | 0.046 | 0.026 | 0.026 | 0.046 | 0.06 | 0 | Example |
| D | 0.080 | 0.70 | 1.15 | 0.015 | 0.0010 | 0.040 | 0.020 | 0.010 | 0 | 0.03 | 0 | Example |
| E | 0.070 | 0.70 | 3.10 | 0.005 | 0.0010 | 0.005 | 0.150 | 0 | 0.150 | 0 | 0 | Comparative Example |
| F | 0.085 | 1.40 | 2.12 | 0.008 | 0.0008 | 0.045 | 0.025 | 0.025 | 0.045 | 0.05 | 0 | Comparative Example |

TABLE 2

| No. | Used Steel Grade | Rolling Reduction Ratio (%) | Arithmetic Average Roughness (Ra) | Average Residual Stress σ in α Fe (211)-plane (MPa) | Hydrogen Concentration (vol %) | Dew-point (° C.) | Maximum Endpoint Temperature of Steel Sheet (° C.) | Holding Time (second) | Alloying Treatment | TS (MPa) | Surface Appearance Quality | Coating Adhesiveness | Powdering Resistance | Note |
|---|---|---|---|---|---|---|---|---|---|---|---|---|---|---|
| 1 | A | 1 | 0.96 | −45 | 8.2 | −40 | 650 | 120 | Undone | 623 | ◯ | ◯ | — | Example |
| 2 | A | 2 | 0.86 | −62 | 10.1 | −45 | 680 | 100 | Done | 602 | ◯ | — | ⊙ | Example |
| 3 | A | 5 | 0.74 | −102 | 12.2 | −35 | 620 | 120 | Done | 645 | ◯ | — | ◯ | Example |
| 4 | B | 0.1 | 2.06 | −23 | 9.8 | −35 | 620 | 180 | Undone | 680 | ◯ | x | — | Comparative Example |
| 5 | B | 3 | 0.64 | −72 | 9.8 | −40 | 650 | 150 | Undone | 664 | ◯ | ◯ | — | Example |
| 6 | B | 5 | 0.51 | −116 | 7.5 | −35 | 660 | 180 | Done | 658 | ◯ | — | ⊙ | Example |
| 7 | B | 7 | 0.45 | −129 | 12.2 | −45 | 780 | 120 | Done | 612 | ◯ | — | ◯ | Example |
| 8 | C | 0.2 | 2.11 | −28 | 7.8 | −35 | 720 | 250 | Undone | 643 | x | x | — | Comparative Example |
| 9 | C | 8 | 0.42 | −131 | 10.1 | −35 | 720 | 180 | Undone | 689 | ◯ | ◯ | — | Example |
| 10 | C | 10 | 0.23 | −235 | 8.1 | −30 | 670 | 200 | Done | 655 | ◯ | — | ⊙ | Example |
| 11 | D | 0.1 | 2.36 | −22 | 3.5 | −40 | 660 | 120 | Done | 792 | x | — | x | Comparative Example |
| 12 | D | 0.3 | 1.78 | −25 | 5.6 | −35 | 650 | 140 | Done | 788 | x | — | x | Comparative Example |
| 13 | D | 3 | 0.84 | −67 | 10.2 | −40 | 650 | 250 | Done | 762 | ◯ | — | ⊙ | Example |
| 14 | D | 5 | 0.54 | −89 | 7.8 | −35 | 700 | 200 | Done | 712 | ◯ | — | ⊙ | Example |
| 15 | D | 7 | 0.42 | −111 | 10.2 | −25 | 670 | 250 | Done | 845 | ◯ | — | ⊙ | Example |
| 16 | D | 10 | 0.27 | −196 | 12.5 | −50 | 800 | 100 | Done | 677 | ◯ | — | ◯ | Example |
| 17 | D | 1 | 1.2 | −51 | 7.8 | −40 | 670 | 180 | Undone | 748 | ◯ | ◯ | — | Example |
| 18 | D | 3 | 1.54 | −73 | 9.8 | −50 | 740 | 200 | Undone | 663 | ◯ | ◯ | — | Example |

TABLE 2-continued

| No. | Used Steel Grade | Rolling Reduction Ratio (%) | Arithmetic Average Roughness (Ra) | Average Residual Stress σ in α Fe (211)-plane (MPa) | Hydrogen Concentration (vol %) | Dewpoint (° C.) | Maximum Endpoint Temperature of Steel Sheet (° C.) | Holding Time (second) | Alloying Treatment | TS (MPa) | Surface Appearance Quality | Coating Adhesiveness | Powdering Resistance | Note |
|---|---|---|---|---|---|---|---|---|---|---|---|---|---|---|
| 19 | D | 5 | 0.89 | −85 | 6.5 | −35 | 700 | 60 | Undone | 765 | ○ | ○ | — | Example |
| 20 | D | 1 | 1.14 | −47 | 7.8 | −40 | 650 | 200 | Done | 651 | ○ | — | ⊙ | Example |
| 21 | D | 3 | 1.68 | −67 | 10.2 | −50 | 700 | 250 | Done | 629 | ○ | — | ⊙ | Example |
| 22 | D | 5 | 0.92 | −93 | 10.8 | −35 | 720 | 40 | Done | 688 | ○ | — | ⊙ | Example |
| 23 | E | 0.2 | 2.25 | −28 | 12.2 | −40 | 750 | 120 | Done | 885 | x | — | Δ | Comparative Example |
| 24 | E | 3 | 1.74 | −75 | 10.8 | −40 | 800 | 150 | Done | 921 | x | — | Δ | Comparative Example |
| 25 | F | 0.5 | 2.98 | −36 | 7.8 | −35 | 700 | 200 | Undone | 905 | x | x | — | Comparative Example |
| 26 | F | 2 | 2.48 | −69 | 12.2 | −35 | 680 | 200 | Undone | 962 | x | x | — | Comparative Example |

As indicated in Table 2, the examples of the present disclosure were good in terms of all of surface appearance quality, coating adhesiveness, and powdering resistance. On the other hand, the comparative examples were poor in terms of one or more of surface appearance quality, coating adhesiveness, and powdering resistance.

INDUSTRIAL APPLICABILITY

The high-strength hot-dip coated hot-rolled steel sheet according to the present disclosure can suitably be used for progressive automobile parts whose strength has improved and thickness has decreased rapidly in recent years.

The invention claimed is:

1. A high-strength hot-dip coated hot-rolled steel sheet comprising:
  a hot-rolled steel sheet having a chemical composition including:
    C: 0.02% or more and 0.30% or less, by mass %,
    Si: 0.01% or more and 1.0% or less, by mass %,
    Mn: 0.3% or more and 2.5% or less, by mass %,
    P: 0.08% or less, S: 0.02% or less, by mass %,
    Al: 0.001% or more and 0.20% or less, by mass %, and
    Fe and inevitable impurities; and
  a hot-dip coating layer formed on a surface of the hot-rolled steel sheet, wherein:
  the high-strength hot-dip coated hot-rolled steel sheet has a tensile strength of 590 MPa or more, and
  the surface of the hot-rolled steel sheet has:
    an arithmetic average roughness Ra of 2.0 μm or less, and
    an average residual stress σ in an α-Fe (211)-plane that satisfies a relationship −250 MPa≤σ≤−30 MPa.

2. The high-strength hot-dip coated hot-rolled steel sheet according to claim 1, wherein the chemical composition further includes one, two, or more of Ti: 0.01% or more and 0.40% or less, by mass %, Nb: 0.001% or more and 0.200% or less, by mass %, V: 0.001% or more and 0.500% or less, by mass %, Mo: 0.01% or more and 0.50% or less, by mass %, and W: 0.001% or more and 0.200% or less, by mass %.

3. A method for manufacturing the high-strength hot-dip coated hot-rolled steel sheet according to claim 1, the method comprising:
  performing hot rolling followed by pickling on steel to form a pickled steel sheet, the steel having a chemical composition including:
    C: 0.02% or more and 0.30% or less, by mass %,
    Si: 0.01% or more and 1.0% or less, by mass %,
    Mn: 0.3% or more and 2.5% or less, by mass %,
    P: 0.08% or less, by mass %,
    S: 0.02% or less, by mass %,
    Al: 0.001% or more and 0.20% or less, by mass %, and
    Fe and inevitable impurities,
  performing rolling on the pickled steel sheet with a rolling reduction ratio of 1% or more and 10% or less, and
  performing a hot-dip coating treatment on the steel sheet after the rolling step.

4. The method for manufacturing a high-strength hot-dip coated hot-rolled steel sheet according to claim 3, wherein the chemical composition further includes one, two, or more of Ti: 0.01% or more and 0.40% or less, by mass %, Nb: 0.001% or more and 0.200% or less, by mass %, V: 0.001% or more and 0.500% or less, by mass %, Mo: 0.01% or more and 0.50% or less, by mass %, and W: 0.001% or more and 0.200% or less, by mass %.

5. The method for manufacturing a high-strength hot-dip coated hot-rolled steel sheet according to claim 4, the method further comprising:
  performing annealing, after the rolling is performed and before the hot-dip coating treatment is performed, in a furnace atmosphere having a hydrogen concentration of 2 vol % or more and 20 vol % or less and a dewpoint of −60° C. or higher and −10° C. or lower with a maximum endpoint temperature (T) of the steel sheet of 650° C. or higher and 750° C. or lower in a temperature range of (T−50)° C. or higher and T° C. or lower for a holding time of 10 seconds or more and 500 seconds or less.

6. The method for manufacturing a high-strength hot-dip coated hot-rolled steel sheet according to claim 5, the method further comprising:
  performing an alloying treatment after the hot-dip coating treatment is performed.

7. The method for manufacturing a high-strength hot-dip coated hot-rolled steel sheet according to claim 4, the method further comprising:

performing an alloying treatment after the hot-dip coating treatment is performed.

8. The method for manufacturing a high-strength hot-dip coated hot-rolled steel sheet according to claim 3, the method further comprising:

performing annealing, after the rolling is performed and before the hot-dip coating treatment is performed, in a furnace atmosphere having a hydrogen concentration of 2 vol % or more and 20 vol % or less and a dewpoint of −60° C. or higher and −10° C. or lower with a maximum endpoint temperature (T) of the steel sheet of 650° C. or higher and 750° C. or lower in a temperature range of (T−50)° C. or higher and T° C. or lower for a holding time of 10 seconds or more and 500 seconds or less.

9. The method for manufacturing a high-strength hot-dip coated hot-rolled steel sheet according to claim 8, the method further comprising:

performing an alloying treatment after the hot-dip coating treatment is performed.

10. The method for manufacturing a high-strength hot-dip coated hot-rolled steel sheet according to claim 3, the method further comprising:

performing an alloying treatment after the hot-dip coating treatment is performed.

\* \* \* \* \*